United States Patent [19]

Rummel et al.

[11] 3,894,430

[45] July 15, 1975

[54] ELECTROMAGNETIC FLOWMETER

[75] Inventors: Theodor Rummel, Hannover-Kirchrode; Rainer Hentschel, Hannover; Eggert Appel, Dransfeld, all of Germany

[73] Assignee: Fischer & Porter Co., Warminster, Pa.

[22] Filed: July 27, 1973

[21] Appl. No.: 383,074

[30] Foreign Application Priority Data
Aug. 16, 1972 Germany............................ 2240054

[52] U.S. Cl. .......................................... 73/194 EM
[51] Int. Cl. ............................................. G01f 1/00
[58] Field of Search ................................ 73/194 EM

[56] References Cited
UNITED STATES PATENTS

| | | |
|---|---|---|
| 2,808,723 | 10/1957 | Buntenbach................... 73/194 EM |
| 3,184,966 | 5/1965 | Thornton et al............... 73/194 EM |
| 3,329,018 | 7/1967 | Hognestad..................... 73/194 EM |
| 3,435,253 | 3/1969 | Robinson........................... 307/237 |
| 3,751,980 | 8/1973 | Fryer............................. 73/194 EM |
| 3,759,097 | 9/1973 | Cushing......................... 73/194 EM |

*Primary Examiner*—Charles A. Ruehl

[57] ABSTRACT

An electromagnetic flowmeter in which a fluid whose flow rate is to be measured is conducted through a flow tube and intersects a magnetic field established by an electromagnet coil to induce a signal voltage across electrodes mounted in the tube. The coil is energized from an A-C power line through a current limiter which functions to maintain the amplitude of the alternating field constant during an extended period of time.

3 Claims, 5 Drawing Figures

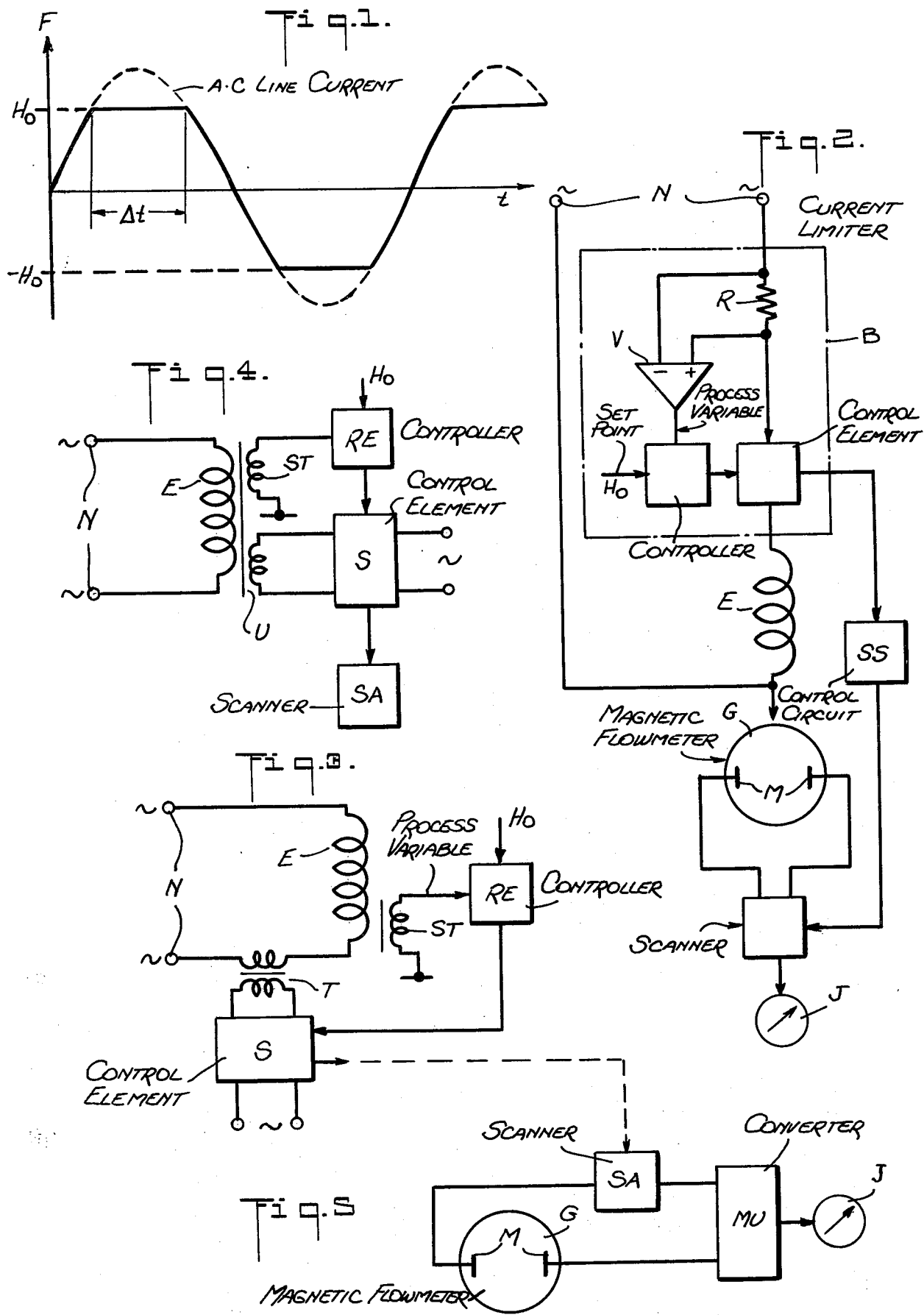

ELECTROMAGNETIC FLOWMETER

BACKGROUND OF THE INVENTION

This invention relate generally to electromagnetic flowmeters, and in particular to a flowmeter whose electromagnet is energized by alternating current.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure quadrature voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltages both with respect to phase and magnitude.

Hence, it becomes necessary periodically to manually re-zero the meter to correct for the effects on zero by the above-described phenomena.

All of the adverse effects encountered in A-C operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous D-C operation, the ideal condition $d\phi/dt = 0$ is satisfied. But D-C operation to create a steady state field is not acceptable, for galvanic potentials are produced and polarization is encountered, as previously explained.

In the yet unpublished German patent application P21 51 381.5, an electromagnetic flowmeter is disclosed in which the electromagnet coil is coupled to an A-C power line to produce an alternating magnetic field, whereby a signal voltage is developed at the measuring electrodes as a result of the flow of fluid in a direction intersecting the magnetic field. In this prior arrangement, a segment of the signal voltage, which is free of spurious voltages, is sampled as the duty cycle in the course of each half wave, and is fed to the measuring circuit. Sampling is effected by a signal scanner activated by the excitation circuit.

Because a quadrature voltage is induced in this prior arrangement, means are provided to suppress the quadrature voltage. This is achieved by a gating operation whereby the value of the signal appearing at the measuring electrodes is measured when the first derivative with respect to time of the alternating excitation current is zero, this occurring at the peaks of the sine wave. At this moment, since the flux is not changing, the quadrature component is then zero. Thus an intermittent series of short duty cycles is fed to the measuring circuit.

The efficiency of this method depends upon a precise sampling phase relation of the signal voltage, for the second derivative with respect to time of the alternating field exhibits a maximum in the zero passage of the first derivative. However conductivity effects of the fluid to be measured and phase shifted secondary components of the magnetic field often interfere with the exact phase relation between the signal voltage and the alternating field, thereby obstructing the sampling of the pure duty cycles so that balancing out of the induced spurious voltages may be required. This requirement involves additional circuits which complicate the design and add to the cost thereof.

Another approach to this problem is disclosed in U.S. Pat. No. 3,329,018 wherein a square wave generator energizes the electromagnetc coil of a flowmeter to produce a square wave alternating field. In this arrangement, the preamplified signal voltage produced at the measuring electrodes is amplified in sections in a D-C amplifier having a controllable feedback circuit, the amplified signal sections being fed to a measurement circuit by way of controllable switches.

The feedback circuit and the switches are synchronously-controlled by the square wave generator whereby only the mid section (duty cycle) of the signal voltage which is free of the quadrature component, is fed to the measurement circuit. Hence in this arrangement there is no need to compensate for the induced quadrature voltage. But the system requires a separate square wave generator as well as a D-C amplifier with controllable feedback and controllable switches in the output circuit.

It is also known (thesis of K. W. Bonfig — "Theory, Problems & Realization of Electromagnetic Flow Measurements by means of a Sampled Steady State Field" — Department for Mechanical and Electrical Engineering of the Institute of Technology of Munich, Germany) how to effect flow measurement by an arrangement in which the electromagnetic field is sampled, and in which the approximately square wave signal voltage in the measurement circuit is sampled during the relatively long period of constant flux density when no quadrature voltage is induced.

In this arrangement there is no need to balance the duty cycle while sampling it. But the need to provide a D-C energy source entails additional expenses, for rectifiers are required. Because a pure, steady state field excitation leads to polarization effects, one must also provide a switching device to generate an alternating field. Peak voltages induced during switching have to be segregated from the sensitive measurement circuits and evaluation stages by means of limiter devices.

SUMMARY OF THE INVENTION

In view of the foregoing, it is the main object of this invention to provide an improved electromagnetic flowmeter whose electromagnetic coil is energized from an A-C power line through a current limiter functioning to maintain the amplitude of the alternating field constant during an extended period of time, whereby the limited half waves in each alternating cycle create an approximately square wave pattern.

A significant advantage of the invention is that the adverse effects of quadrature or spurious voltages are avoided by a relatively simple, low cost circuit to make possible accurate and reliable flowmeter indications.

Briefly stated these objects are accomplished in an electromagnetic flowmeter whose electromagnet coil is supplied with excitation current from an alternating-current power line, the amplitude of the sinusoidal current supplied to the coil being limited during a predetermined interval in the course of each positive and negative half wave of the A-C cycle to maintain the amplitude constant during this interval.

A scanner is interposed between the measuring electrodes of the flowmeter and the flowmeter indicator circuit, the scanner being operatively coupled to the limiter means and acting to transmit the signal voltage developed at the electrodes to the indicator only during the predetermined interval in each half wave, whereby the effects of quadrature voltages are avoided.

OUTLINE OF THE DRAWINGS

For a better understanding of the invention as well as further objects and features thereof, reference is made to the following detailed descriptions to be read in conjunction with the accompanying drawing wherein:

FIG. 1 illustrates the pattern of the alternating magnetic field established in an electromagnetic flowmeter in accordance with the invention;

FIG. 2 is a schematic diagram showing one preferred embodiment of the flowmeter;

FIG. 3 is a schematic diagram showing a second preferred embodiment of the flowmeter;

FIG. 4 is a schematic diagram showing a third preferred embodiment of the flowmeter system; and FIG. 5 is a block diagram showing the measurement circuit used in conjunction with the embodiment illustrated in FIG. 3.

DESCRIPTION OF THE INVENTION

Referring now to the drawing and more particularly to FIG. 2, there is shown one preferred embodiment of a flowmeter system in accordance with the invention. The system is constituted by a primary in the form of an electromagnetic flowmeter adopted to produce a low-level A-C electrode signal whose amplitude is proportional to the flow rate of the fluid being measured, and a secondary that converts this signal to a proportional D-C output signal to indicate the flow rate.

The flowmeter primary includes a flow tube G, through which the fluid to be measured is conducted, and an electromagnet provided with a coil E which establishes a magnetic field transverse to the direction of flow which is parallel to the longitudinal axis of the tube. Electrodes M in contact with the flowing fluid, are disposed at diametrically-opposed points on the flow tube on an axis perpendicular both to the longitudinal direction of flow and the transverse magnetic field.

As is well known, a voltage is induced in the fluid intersecting the magnetic field, this voltage being transferred to electrodes M to produce a signal at the flowmeter primary output terminals that reflects the flow rate. This signal is referred to as the flow-induced signal, to distinguish it from spurious signal components that are independent of flow rate.

Magnet coil E is energized by an amplitude-limited, lowfrequency (i.e., 50 or 60 Hz) alternating-current supplied by a current limiter B coupled at terminals N to a standard A-C power line. The resultant alternating electromagnetic field F is illustrated in FIG. 1 wherein the dashed-line curve represents the standard sinusoidal A-C line current and the solid-line curve shows the alternating magnetic field strength pattern produced by an amplitude-limited A-C in accordance with the invention.

The action of current limiter B is such that during the positive half-wave of the sinusoidal cycle, when the amplitude reaches the level indicated by the flux density value Ho, it is held to this level for a time period $\Delta t$, and when during the negative half-wave the amplitude reaches the level indicated by value − Ho, it is held to this level for a like time period. Thus the current limiter maintains a constant field at level Ho so that no quadrature voltage will be induced.

Current limiter B includes a bipolar control element S, operating in both current directions. The limiter may, for example, be formed by controllable semiconductor rectifiers. Control element S is connected to the A-C power line terminals N in series with a fixed resistor R and the coil E to vary current flow through the coil. The operation of control element S is governed by an electronic controller RE which compares a set point value with a process variable. The set point is determined by level Ho and the process variable is derived from the output of a high-impedance operational amplifier V whose inputs are connected across resistor R.

Control element S serves also to activate a control circuit SS which, in turn, activates a signal scanner SS interposed between measuring electrodes M and the secondary of the flowmeter system. Only the indicator J of the secondary is shown in FIG. 2. Scanner SS functions to transmit the duty cycle from measuring electrodes M to indicator J only during the period $\Delta t$ (FIG. 1) when the field amplitude level Ho constant; hence when no quadrature voltage can be induced. Thus a limitation of the magnetic current is enforced by a current supplied to the electromagnet coil E, in the manner above described.

In FIG. 3, another preferred arrangement is shown for limiting the field established by coil E. In this arrangement, coil E is connected to A-C power line terminals N in series with the secondary of a transformer T whose primary is connected to the same power line by the bipolar control element S. Control element S is governed, as before, by electronic controller RE to which is applied the set point (level Ho). The process variable applied to the controller is derived from a quadrature signal receiver ST in the form of a coil inductively coupled to electromagnet coil E.

Transformer T is therefore supplied with current by control element S which is governed by controller RE, thereby limiting the amplitude of the current during the period $\Delta t$ to maintain the flux density Ho at a constant level. Control element S in FIG. 3, as in the case of FIG. 2, is coupled to scanner SA (see FIG. 5) which serves to transmit the duty cycle from measuring electrodes M of the primary to the secondary only during the period $\Delta t$ when the field amplitude level Ho is constant. In FIG. 5 it will be seen that the secondary of the flowmeter includes a converter MU that converts the A-C signal taken from the measuring electrodes M into an analog D-C voltage for operating indicator J.

In the embodiment shown in FIG. 4, rather than a transformer as in the arrangement shown in FIG. 3, an auxiliary coil U is provided which is inductively coupled to magnet coil 3 and acts in opposition to the A-C field developed by coil 3 during the time period $\Delta t$ so as to maintain constant the flux density Ho.

Auxiliary coil U is energized from the A-C power line through the control element S whose operation is governed by electronic controller RE whereby the current fed to the auxiliary coil by the control element produces a magnetic field component which is superimposed over the field produced by coil E during the period $\Delta t$ in opposition thereto. Coil E is energized directly by the A-C power line, hence the current therethrough would ordinarily have the usual sinusoidal form to produce a field having a corresponding form. But because the auxiliary coil U produces during period $\Delta t$, a field which bucks the field of coil E, the resultant field pattern has the desired amplitude-limited form shown in FIG. 1.

While there have been shown preferred embodiments of a flowmeter arrangement in accordance with the invention, it is to be understood that other modifications may be made which fall within the spirit of the invention as set forth herein.

We claim:

1. In an electromagnetic flowmeter operated from a standard alternating-current power line producing a sinusoidal current, said flowmeter having a flow tube provided with a pair of measuring electrodes and an electromagnetic coil for establishing a field which is intersected by a fluid passing through the tube to produce a signal voltage across said electrodes whose amplitude is a funtion of flow rate, said signal being applied to an indicator; the combination comprising:

A. Means including a limiter having a bipolar control element to supply said current from said alternating-current power line to said coil and a controller operatively coupled to said control element to limit the amplitude of said current during a predetermined interval in the course of each positive and negative half wave to maintain the amplitude substantially constant during said intervals, and B. Scanner means interposed between said electrodes and said indicator and operatively coupled to said limiter means to transmit the signal voltage from said electrodes to said indicator only during said interval, whereby the effects of quadrature voltages are avoided.

2. In a flowmeter as set forth in claim 1 wherein said limiter means includes said bipolar control element and a resistor, said element and said resistor being connected in a series with said coil to said A-C power line, and wherein said controller for governing the operation of said control element is arranged to compare a set point determined by the desired constant current amplitude and a process variable determined by the voltage drop across said resistor.

3. In a flowmeter as set forth in claim 2 wherein said process variable is derived by means of an operational amplifier whose output is coupled to said controller and whose inputs are connected across said resistor.

* * * * *

UNITED STATES PATENT OFFICE
CERTIFICATE OF CORRECTION

PATENT NO. : 3,894,430
DATED : July 15, 1975
INVENTOR(S) : Theodor Rummel, Rainer Hentschel and Eggert Appel It is certified that error appears in the above-identified patent and that said Letters Patent are hereby corrected as shown below:

Column 1, line 5 "relate" should have read -- relates

Column 2, line 58 "electromagnetc" should have read -- electromagnet --

Column 4, line 38 "lowfrequency" should have read -- low-frequency --

Column 5, line 8 -- is -- should have been inserted before "constant"

Column 5, line 10 after "a" -- limitation of the -- should have been inserted

Column 6, line 20 "funtion" should have read -- function --

Signed and Sealed this sixteenth Day of September 1975

[SEAL]

Attest:

RUTH C. MASON
Attesting Officer

C. MARSHALL DANN
Commissioner of Patents and Trademarks